United States Patent [19]

Poe

[11] Patent Number: 5,624,221
[45] Date of Patent: Apr. 29, 1997

[54] MULTIPLE SPEED FASTENER

[75] Inventor: L. Richard Poe, Palm Desert, Calif.

[73] Assignee: Hartwell Corporation, Placentia, Calif.

[21] Appl. No.: 505,471

[22] Filed: Jul. 21, 1995

[51] Int. Cl.[6] .................................................. F16B 35/02
[52] U.S. Cl. ................................................ 411/383; 411/384
[58] Field of Search .................................... 411/383, 412, 411/413, 402, 6, 7, 384

[56] References Cited

U.S. PATENT DOCUMENTS

| 4,925,364 | 5/1990 | Das | 411/383 |
|---|---|---|---|
| 5,030,052 | 7/1991 | Anderson | 411/383 |
| 5,123,794 | 6/1992 | Pire | 411/383 |
| 5,205,693 | 4/1993 | Fuller | 411/383 |
| 5,328,312 | 7/1994 | Driscoll | 411/383 |

*Primary Examiner*—Steven N. Meyers
*Assistant Examiner*—Gary Estremsky
*Attorney, Agent, or Firm*—Pretty, Schroeder & Poplawski

[57] ABSTRACT

The presently preferred embodiment of the invention is a multiple speed fastener having a first pair of interengageable threaded members with a first pitch and a first thread direction, a second pair of interengageable threaded members with a second pitch different from the first pitch and a second thread direction different from the first thread direction, the first pair including a first actuator threadably engageable with a first threaded member and the second pair including a second actuator threadably engageable with a second threaded member, and a coupling means for coupling the first pair to the second pair, with the first actuator and the coupling means having first means for selectively engaging the first actuator and coupling means to rotate the coupling means with the first actuator, and with the coupling means and the second actuator having second means for engaging the second actuator to rotate the second threaded member when the first actuator and coupling means are engaged.

16 Claims, 3 Drawing Sheets

MULTIPLE SPEED FASTENER

BACKGROUND OF THE INVENTION

This invention relates to fasteners for joining components, and in particular to a new and improved fastener suitable for use when components are to be jointed and disconnected rapidly while at the same time requiring relatively large forces for bringing the components together.

Fasteners for rapid fastening and release operations have been in use for a considerable period of time, especially in the aerospace industry. At the same time, it is desirable to avoid requiring any special tools for operating the fasteners, since these special tools must be available whenever and wherever access is required.

One fastener in general use today which avoids the time required for conventional screw fasteners and also special tool requirements is the quarter turn fastener which is widely used to replace common screws and bolts.

However, the quarter turn fastener does not have the capability of drawing structures or components together over separations of several inches, but is limited to small fractions of an inch. At the present time, threaded fasteners or elaborate latching mechanisms are used where the component spacing is in the order of inches. Large "V" bands currently used for securing sections of aircraft engines together require tightening through several inches into a preload of thousands of pounds and represent one application where a high speed fastener operable over a range of inches and capable of exerting high forces is required.

A special tool such as speed wrenches must be used for fastening with common threaded fasteners. Latching devices for such applications suffer from greater weight and size and also from the inability to provide accurate preloading on components being fastened.

Accordingly, it is an object of the present invention to provide a new and improved fastener which can operate at two speeds, with a fast speed low force portion for initially drawing the structures together and a slow speed high force portion for completing the closing.

Another object is to provide such a multiple speed fastener which operates in essentially the same manner as a common bolt, while requiring relatively few turns so that the fastener can be operated with an ordinary wrench.

A particular object of the invention is to provide such a multiple speed fastener which operates with a high pitch thread until a particular operating load is reached, and then automatically continues operating with a low pitch thread with increased mechanical advantage until the closing operation is completed.

Common fasteners with threads of differing pitches must be operated individually. To place two threads of differing pitch on a single shaft for threading into a receiving member of either pitch, or both pitches, would jam at the transition from one thread form to the other.

It is another object of the invention to provide a multiple speed fastener which achieves the transition from fast pitch to slow pitch without stripping threads or brinneling components or jamming.

Other objects, advantages, features and results will more fully appear in the course of the following description.

SUMMARY OF THE INVENTION

The presently preferred embodiment of the invention is a multiple speed fastener having a first pair of interengageable threaded members with a first pitch and a first thread direction, a second pair of interengageable threaded members with a second pitch different from the first pitch and a second thread direction different from the first thread direction, the first pair including a first actuator threadably engageable with a first threaded member and the second pair including a second actuator threadably engageable with a second threaded member, and a coupling means for coupling the first pair to the second pair, with the first actuator and the coupling means having first means for selectively engaging the first actuator and coupling means to rotate the coupling means with the first actuator, and with the coupling means and the second actuator having second means for engaging the second actuator to rotate the second threaded member when the first actuator and coupling means are engaged.

The coupling means of the invention also provides for bringing the threaded members together at a fast rate to a predetermined position and then changing to a slow rate to bring the threaded members closer together.

Viewed differently, the fastener of the invention which provides for drawing first and second structure members together and securing them in position, includes a plurality of pairs of dissimilarly threaded elements, each of the pairs having matching male and female parts, a continuous elongated member, means for slideably and rotatably mounting the pairs as an assembly on the continuous elongated member extending through the threaded elements, the assembly having adjacent one end an accommodation for a turning tool and on the opposing end a captivating means to secure the pairs of threaded elements on the elongated member, with the accommodation for a turning tool including means for transmitting applied turning forces simultaneously and independently to the pairs of threaded elements, initially rapidly drawing the first structure member to the second structure member and subsequently transmitting applied turning forces to only one of the pairs of threaded elements less rapidly drawing the first structure member to the second structure member, for securing the structure members into a highly loaded position by applying fewer turns of the turning tool with less turning force than would be required for a single threaded element.

BRIEF DESCRIPTION OF THE DRAWINGS

FIG. 4A is a partial view of the drive member 22 of FIG. 4, showing an alternate form of the opening 35;

DESCRIPTION OF THE PREFERRED EMBODIMENT

Figure 4:
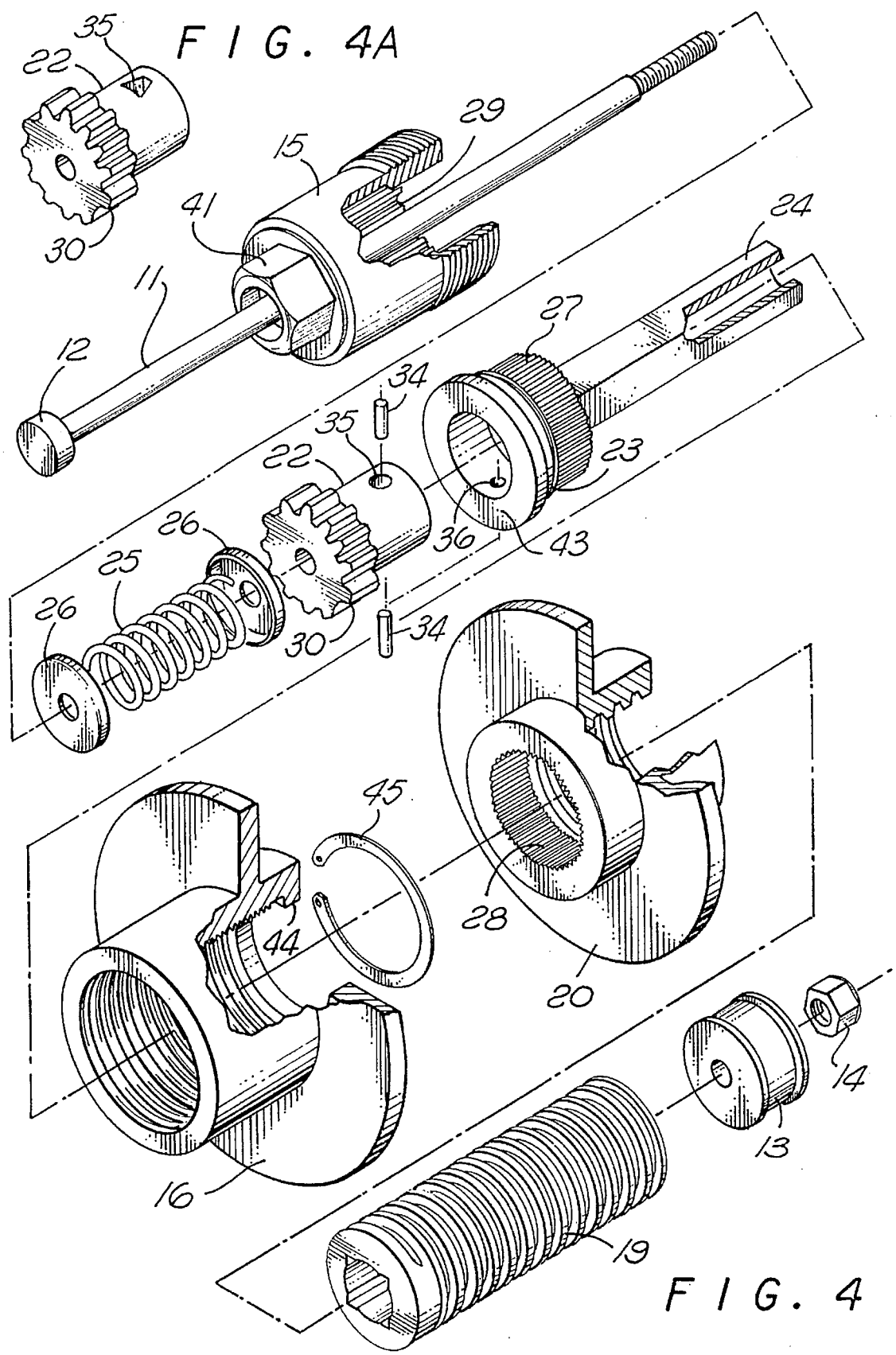
FIG. 4 is an exploded view showing the components of the fastener of FIGS. 1–3.

Referring to the drawings, particularly FIG. 4, the fastener of the invention includes a shaft or through bolt 11, with a head 12 at one end and with a thrust spring 13 and nut 14 at the other end.

A first pair of interengageable threaded members or elements comprising a first actuator 15 and a first threaded member or plate 16 is carried on the shaft 11. The actuator 15 has an external or male thread for engaging an internal or female thread of the first threaded member 16. In the embodiment illustrated, this thread is left-handed and has a relatively fine pitch or a fine lead thread.

A second pair of interengageable threaded members or elements comprising a second actuator 19 and second threaded member or plate 20 is also mounted on the shaft 11. The second actuator 19 has an external or male thread for engaging an internal or female thread on the plate 20. In the embodiment illustrated, the thread is right-handed and has a relatively coarse pitch or a fast lead thread.

A coupling assembly is provided for coupling the first actuator 15 to the second actuator 19 and includes a drive member 22, a driver member 23 with an elongated non-round rod or sleeve 24, and a spring 25. The spring, end caps, the drive member and the driver member are positioned on the shaft 11. Typically the spring has end caps 26 over each end of the spring for centering the spring on the shaft. The second actuator 19 has an internal passage which mates with the external shape of the rod 24 and is positioned on the rod for rotation with the driver member 23.

The driver member 23 and the threaded member or plate 20 have mating components for joining the two members for rotation under certain conditions, and in the embodiment illustrated, a serrated outer surface 27 on the driver member 23 engages a serrated inner surface 28 of the second plate 20. Similar means are provided for coupling the first actuator 15 to the drive member 22, comprising an inner gear tooth or spline on the first actuator 15 and an outer gear tooth or spline shaft on the drive member 22.

The drive member 22 and driver member 23 are joined by pins 34 in aligned radial openings 35, 36. The pins 34 are push fits in the openings 36 of the driver member 23. The pins are slip fits in the openings 35 in the drive member 22. The openings 35 may be circular as illustrated in FIG. 4 or may be trangular as seen in FIG. 4A. The circular opening is presently preferred. With this arrangement, the drive member and driver member are joined for rotational movement, but can translate axially with respect to each other.

The driver member 23 has a flange 43 positioned within a flange 44 of the first threaded member 16, with the driver member held in engagement with the first threaded member by a snap ring 45.

Figure 1:
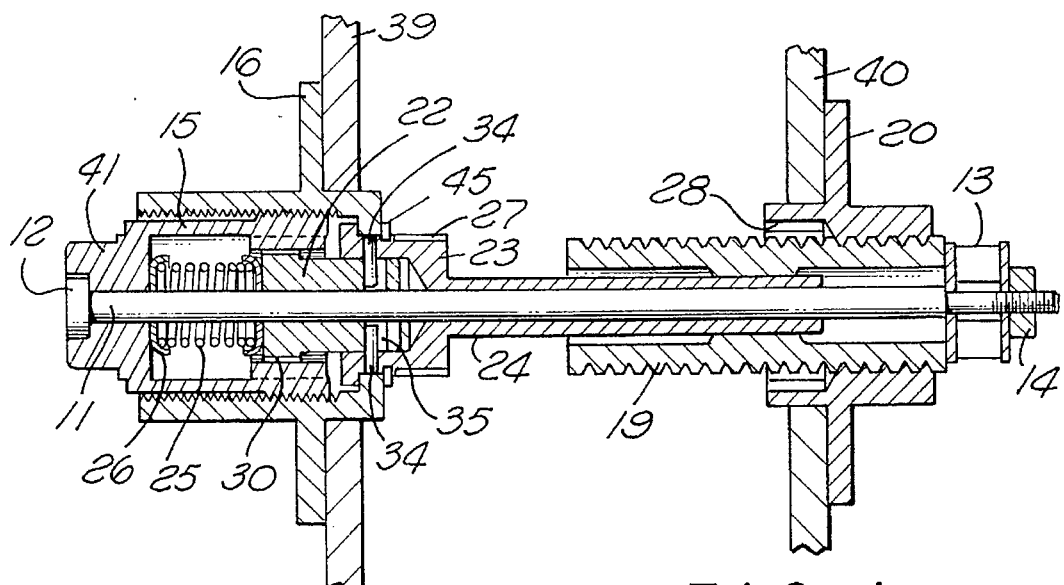
FIG. 1 is an axial sectional view of a multiple speed fastener in the fully open position and incorporating the presently preferred embodiment of the invention.

The fastener is shown in the open position in FIG. 1, with the first plate 16 attached to a first structure 39 and the second plate 20 attached to a second structure 40, by welding or by bolts or otherwise as desired. The purpose of the fastener is to draw the structures 39, 40 together rapidly initially and ultimately with a high force, using a conventional tool such as a wrench. An accommodation for a turning tool, typically a conventional bolt head 41, is provided on the first actuator 15 for rotation of the first actuator with a conventional tool, such as a wrench. In operation, to bring the structures together, the shaft 11 is rotated clockwise as viewed from the bolt head end. This rotation of the fine thread of the actuator 15 moves the first plate 16 and the first structure 39 along the shaft 11, to the right as seen in FIG. 1. The rotation of the first actuator 15 also rotates the coarse thread second actuator 19 and moves the second plate 20 and second structure 40 to the left.

Figure 2:
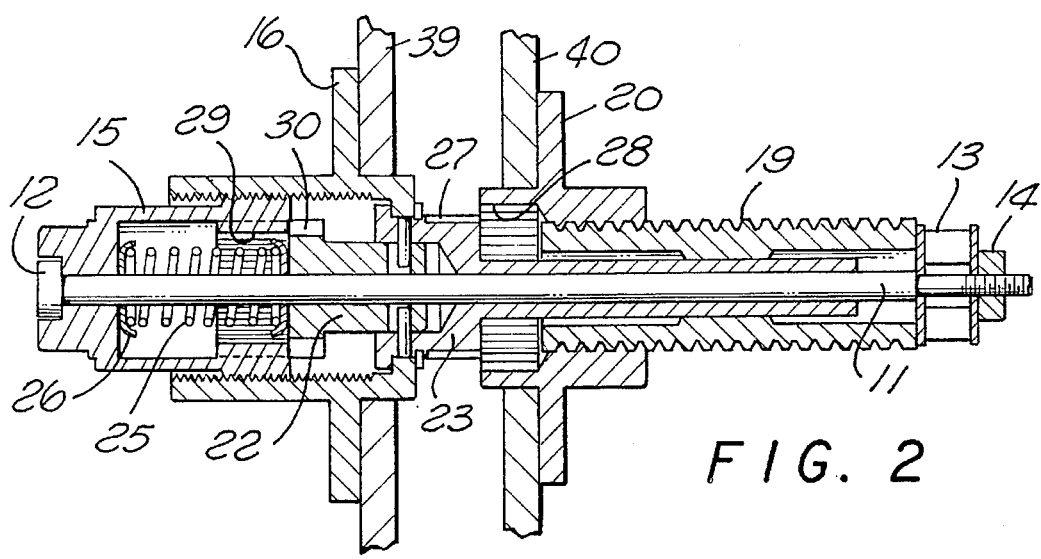
FIG. 2 is a view similar to that of FIG. 1 showing the fastener position at the transition from high speed to low speed operation.

This action continues with a relatively rapid translation of the plate 20 and structure 40 to the left until the fastener arrives at the position of FIG. 2. At this time, the drive member 22 disengages from the first actuator 15 and thereafter, there is no rotation of the second actuator 19 as rotation of the first actuator 15 is continued, bringing the two structures to the desired closed position of FIG. 3.

In the initial position of FIG. 1, the drive member 22 is within the first actuator 15, with the spline shaft 30 of the drive member engaging the spline 29 of the actuator. As the actuator 15 is rotated, the threaded member 16 moves to the right and carries the driver member 23 and drive member 22 with it, by means of the snap ring 45 and pins 34. As the first actuator continues to rotate, the spline shaft 30 of the drive member 22 moves out of engagement with the spline 29 of the actuator 15 to the position of FIG. 2. At this time, rotation of the drive member 22, driver member 23 and second actuator 19 ceases. Also, the serrated outer surface 27 of the driver member 23 engages the serrated inner surface 28 of the second plate 20 to prevent the driver member from further turning, locking the coarse threaded member 19 from threading back out of the second plate member 20.

Figure 3:
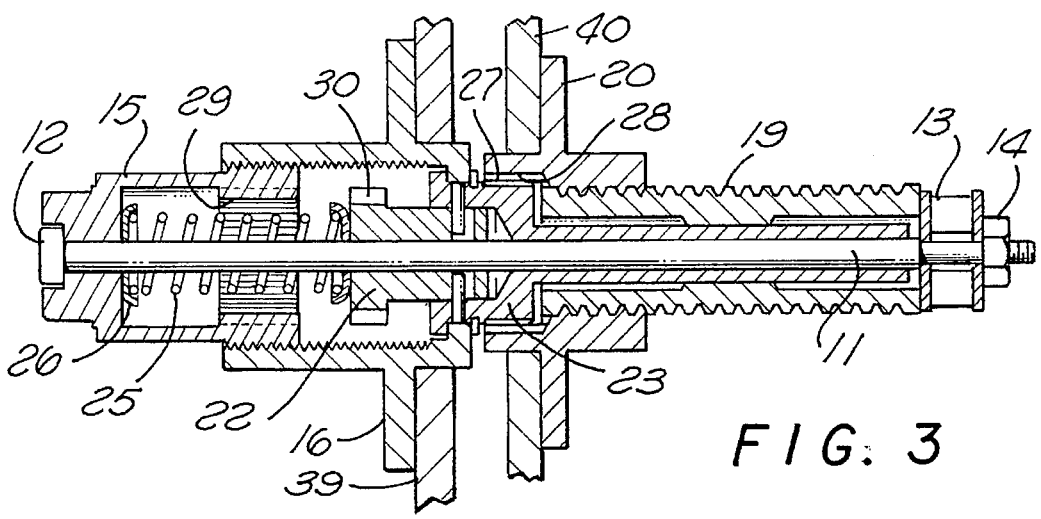
FIG. 3 is a view similar to that of FIGS. 1 and 2 showing the fastener in the fully closed position.

Continued rotation of the first actuator 15 continues to move the plate 16 toward the plate 20 with the fine thread providing the desired increased force for completing the fastening operation, as shown in FIG. 3. The two structures are separated by reversing rotation of the shaft 11.

At the transition between high speed and low speed closure shown in FIG. 2, the spring disengages the drive member 22 from the actuator 15 when the actuator 19 has been rotated to its full extent at the end of the threads. At this point, the operator senses the engagement of the stop and releases the torque on the bolt head of the actuator 15. This release of torque permits the spring 25 to push the drive member 22 out of engagement with the actuator 15, moving the drive member 22 from the position of FIG. 2 to the position of FIG. 3.

Figure 5:
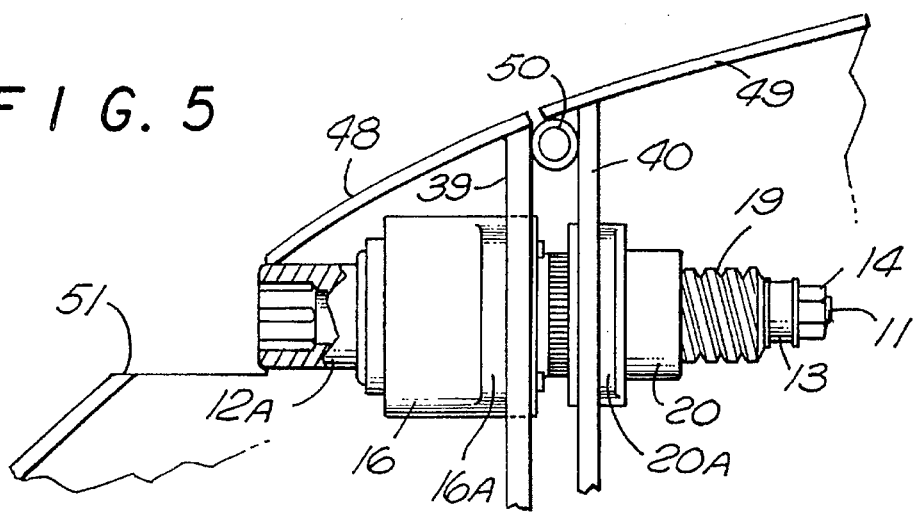
FIG. 5 is a view illustrating the use of the fastener in a radome type installation.

The multiple speed fastener of the invention is shown in FIG. 5 in use for joining portions 48, 49 of a radome or the like, with the structure 39 attached to the portion 48 and the structure 40 attached to the portion 49. A sealing gasket 50 is provided between the structures 39, 40. The shaft 11 has an internal socket head 12A for operation of the fastener through an opening 51 in the portion 48 of the radome. Components 16 and 20 may have mounting flanges 16A, 20A, respectively, for attachment to the structures 39, 40, respectively.

Figure 6:
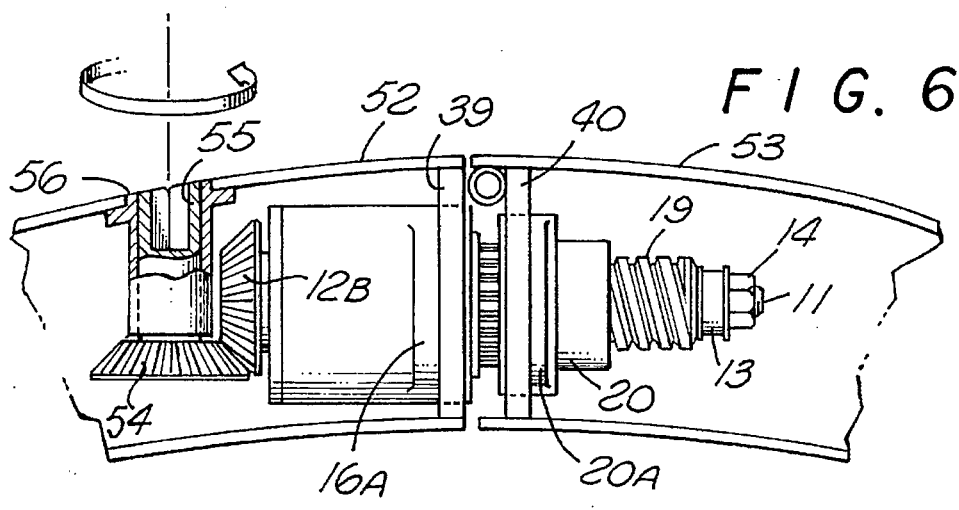
FIG. 6 is a view similar to that of FIG. 5 illustrating the use of the fastener in a cowling type application.

Another application for the multiple speed fastener in an engine cowling is shown in FIG. 6, with portions 52, 53 of the cowling being connected to structures 39, 40, respectively. In this installation the shaft 11 is driven by a bevel gear 54 which engages a bevel gear head 12B of the shaft 11, with the gear 54 driven through a socket 55 in an opening 56 in the cowling.

Figure 7:
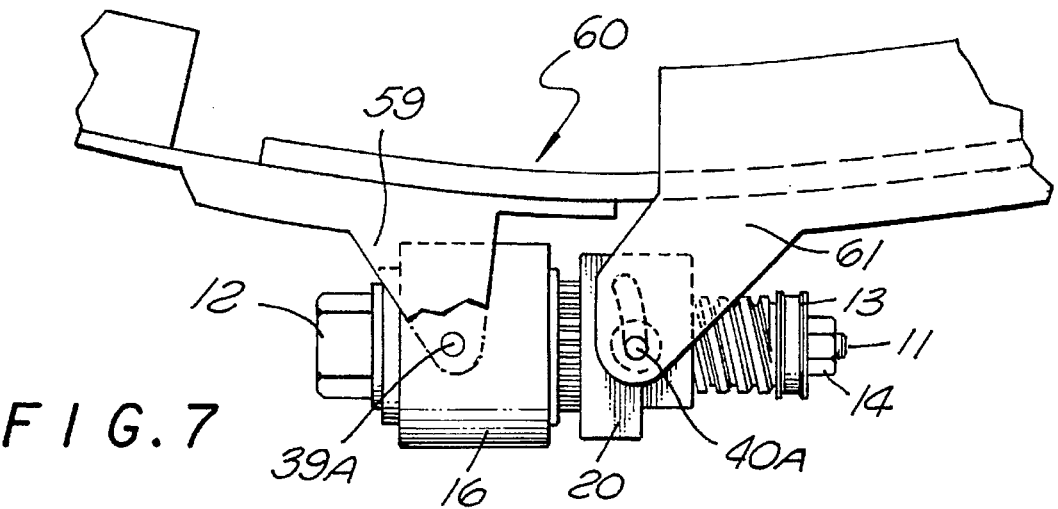
FIG. 7 is a view similar to that of FIGS. 5 and 6 illustrating the use of the fastener with a "V" band.

Another application utilizing a "V" band type band fastener is shown in FIG. 7. The first threaded member or plate 16 has a pin 39A which engages ears 59 of a "V" band 60, and the second threaded member or plate 20 has another pin 40A which rides in a slot of ears 61 of the "V" band.

The operation of the multiple speed fastener is the same for each of these applications. Other similar uses for the two speed fastener will be apparent.

I claim:

1. In a multiple speed fastener, the combination of:
   a first pair of interengageable threaded members having a first pitch and a first thread direction of rotation for advancement;

a second pair of interengageable threaded members having a second pitch different from said first pitch and a second thread direction of rotation for advancement opposite that of said first thread direction of advancement;

said first pair including a first actuator and a first threaded member threadably engagable with said first actuator;

said second pair including a second actuator and a second threaded member threadably engageable with second said actuator;

a shaft with said first and second pairs slidably and rotatably mounted on said shaft;

coupling means for coupling said first pair to said second pair;

said first actuator and said coupling means having first means for selectively engaging said first actuator and said coupling means to rotate said coupling means with said first actuator;

said coupling means and said second actuator having second means for engaging said second actuator to rotate said second threaded member when said first actuator and coupling means are engaged; and said first and second threaded members including means for attachment to structures to be fastened together.

2. A fastener as defined in claim 1 wherein said coupling means includes a drive unit, said drive unit and said first actuator having interengaging means for rotation of said drive unit with said first actuator and for axial translation of said drive unit relative to said first actuator, said drive unit and said second actuator having interengageable means for rotation of said second actuator with said drive unit.

3. A fastener as defined in claim 2 wherein said drive unit includes a drive member, a driver member, and means for joining said drive and driver members for simultaneous rotation and for axial translation of said drive member relative to said driver member between first and second positions.

4. A fastener as defined in claim 3 including a spring positioned between said first actuator and said drive member for urging said drive member toward said first position.

5. A fastener as defined in claim 4 wherein said means for joining includes pin means positioned in aligned openings in said drive and driver members.

6. A fastener as defined in claim 5 wherein said driver member includes a collar with a non-round rod, with said second actuator carried on said non-round rod for rotation with said coupling means.

7. A fastener as defined in claim 1 wherein said first pitch of said first pair is finer than said second pitch of said second pair.

8. A fastener as defined in claim 7 wherein said first thread direction of said first pair is left-handed and said second thread direction of said second pair is right-handed.

9. A fastening means to draw first and second structure members together and secure them in position, including in combination:

a plurality of pairs of dissimilarly threaded elements, each of said pairs having matching male and female parts, with one of said pairs having a first pitch and a first thread direction of rotation for advancement and with the other of said pairs having a second pitch different from said first pitch and a second thread direction of rotation for advancement opposite that of said first thread direction;

a continuous elongated member;

means for slideably and rotatably mounting said pairs as an assembly on said continuous elongated member extending through said threaded elements;

said assembly having adjacent one end an accommodation for a turning tool and on the opposing end a captivating means to secure said pairs of threaded elements on said elongated member;

said accommodation for a turning tool including means for transmitting applied turning forces simultaneously and independently to said pairs of threaded elements, initially rapidly drawing the first structure member to the second structure member and subsequently transmitting applied turning forces to only one of said pairs of threaded elements less rapidly drawing the first structure member to the second structure member, for securing the structure members into a highly loaded position by applying fewer turns of the taming tool with less turning force that would be required for a fastening means with only one pair of threaded elements.

10. A fastening means as defined in claim 9, with one of said pairs having a fine lead thread and the other of said pairs having a fast lead thread, with first mounting means on said female part of said fine thread pair for attaching said assembly to the first structure, and second mounting means on said female part of said fast lead thread pair for attaching said assembly to the second structure;

means for turning said male parts of said fast lead pair and said fine thread pair simultaneously through a prescribed distance in response to a turning force applied to said accommodation;

means for stopping turning of said fast lead thread male part at said prescribed distance; and means for applying said turning force solely to said fine thread male part for the remainder of securing the structure members into a highly loaded position.

11. A fastening means as defined in claim 10, including an elongated member rotatably captive within said female part of said fine thread pair and extending through said male part of said fast lead thread pair;

with said male part of said fast lead thread pair non-rotatably mounted upon said elongated member and rotatably mounted upon said elongated member;

said fine thread male part having a female gear portion;

a male gear head member meshing with said female gear portion through said prescribed distance and turning in response to said turning force applied to said accommodation; and means for disengaging said male gear head member at the end of said prescribed distance terminating said turning of said fast lead thread male part in response to said turning force being applied to secure the structure members.

12. A fastening means as defined in claims 11, with said elongated member having a serrated portion rotatably captive within said female part of said fine thread pair, said female part of said fast lead thread pair having a serrated portion meshing with said elongated member serrated portion at the end of said prescribed distance preventing rotation of said male part of said fast lead thread pair throughout the remainder of said securing of the structures.

13. A fastening means as defined in claims 12, wherein said male gear head member has an opening and including mounting pin means for securing said male gear head member to said elongated member;

said opening and pin means forcing said male gear head member into greater engagement with said female gear member when said turning force is applied to said assembly; and spring means mounted within said male part of said fine thread element for resisting forcing of said male gear head member into greater engagement and for forcing said male gear head member out of said greater engagement with said female head gear portion whenever said turning force is not being applied.

14. A fastening means as defined in claim 13 wherein said fine lead thread pair has a left-hand thread and said fast lead thread pair has a right-hand thread.

15. A fastening means as defined in claim 14 wherein said mounting means on said female part of said fast lead thread element is releaseably attached to the second structure member.

16. A fastening means as defined in claim 15, including a thrust bearing on said elongated member between said secured end and the end of said fast lead thread male part for preventing frictional forces from turning said fast lead thread male part when said turning force is reversed to unthread said assembly and separate the structures.

* * * * *